(12) United States Patent
Garden

(10) Patent No.: US 8,277,595 B2
(45) Date of Patent: Oct. 2, 2012

(54) METHOD AND APPARATUS FOR DUPLICATION OF SURFACE COATING COMPOSITION

(76) Inventor: Patricia C Garden, Scottsdale, AZ (US)

(*) Notice: Subject to any disclaimer, the term of this patent is extended or adjusted under 35 U.S.C. 154(b) by 420 days.

(21) Appl. No.: 12/587,542

(22) Filed: Oct. 8, 2009

(65) Prior Publication Data

US 2011/0084241 A1   Apr. 14, 2011

(51) Int. Cl.
B29C 65/00 (2006.01)
B32B 37/00 (2006.01)
B32B 38/00 (2006.01)

(52) U.S. Cl. ............... 156/256; 156/64; 252/588

(58) Field of Classification Search ............ 705/26.81, 705/26.2, 26.5; 156/253, 257, 264, 268, 156/270, 256, 64; 252/588
See application file for complete search history.

(56) References Cited

U.S. PATENT DOCUMENTS

| | | | | |
|---|---|---|---|---|
| 4,488,922 A | * | 12/1984 | Instance | 156/192 |
| 5,019,436 A | * | 5/1991 | Schramer et al. | 428/41.9 |
| 2004/0256398 A1 | * | 12/2004 | Alfoldi et al. | 220/662 |
| 2005/0236113 A1 | * | 10/2005 | Tani et al. | 156/558 |

* cited by examiner

Primary Examiner — Linda L Gray
(74) Attorney, Agent, or Firm — Tod R. Nissle P.C.

(57) ABSTRACT

A method is provided to duplicate a custom coating composition. A laminate strip is die cut to form a bi-layer transparent labels on a backing strip. Each label includes a backing of release adhesive. The transparent labels are applied to cover indicia on a container of a custom composition coating.

1 Claim, 4 Drawing Sheets

METHOD AND APPARATUS FOR DUPLICATION OF SURFACE COATING COMPOSITION

This invention relates to surface coatings.

More particularly, the invention relates to an improved method and apparatus to insure that indicia or data defining a customized surface coating composition or other composition can be captured to insure that the coating can be duplicated.

Custom paint and other compositions are utilized in a variety of instances including military, business, and consumer applications. A long existing motivation in connection with such compositions is to be able to retrieve formulation data so that the composition can be duplicated. This can be particularly important when the composition contains components which affect properties of the composition other than, or in addition to, color, so that the composition can not be satisfactorily reproduced by simply utilized a "color gun" or apparatus to determine the particular color shade of the composition.

Accordingly, it would be highly desirable to provide an improved method and apparatus for retrieving custom composition formulation data.

Therefore it is a principal object of the invention to provide an improved method and apparatus to save and recover custom composition formulation data.

Another object of the invention is to provide an improved method and apparatus to store and electronically or optically retrieve custom composition formulation date.

BRIEF DESCRIPTION OF THE SEVERAL VIEWS OF THE DRAWINGS

These and other, further and more specific objects and advantages of the invention will be apparent to those skilled in the art from the following detailed description thereof, taken in conjunction with the drawings, in which.

Briefly, in accordance with the invention, I provide an improved method to define, produce, and duplicate a surface coating. The method includes the steps of providing a laminate strip with multiple transparent label layers and multiple adhesive layers; die cutting the laminate strip to produce a label strip comprising a plurality of bi-layer transparent separable labels removably secured to a backing strip, each of the layers including an upper layer and a lower layer; packaging the label strip; shipping the label strip to a distribution center; defining at the distribution center components of a surface coating composition; admixing at the distribution center in a container the components to produce the surface coating composition; producing an optically detectable identification label that enumerates the components; applying the identification label to the container; removing one of the transparent separable labels from the label strip; applying the removed transparent separable label to the container to cover the identification label; transporting the container to a work location; utilizing at the work location the surface coating composition from the container; electing to duplicate the custom composition; transporting the container to the distribution center; peeling the upper layer off the lower layer of the transparent label on the container; optically reading through the lower layer of the transparent label the components on the identification label; and, admixing the components to produce an additional quantity of the custom coating composition.

Figure 1:
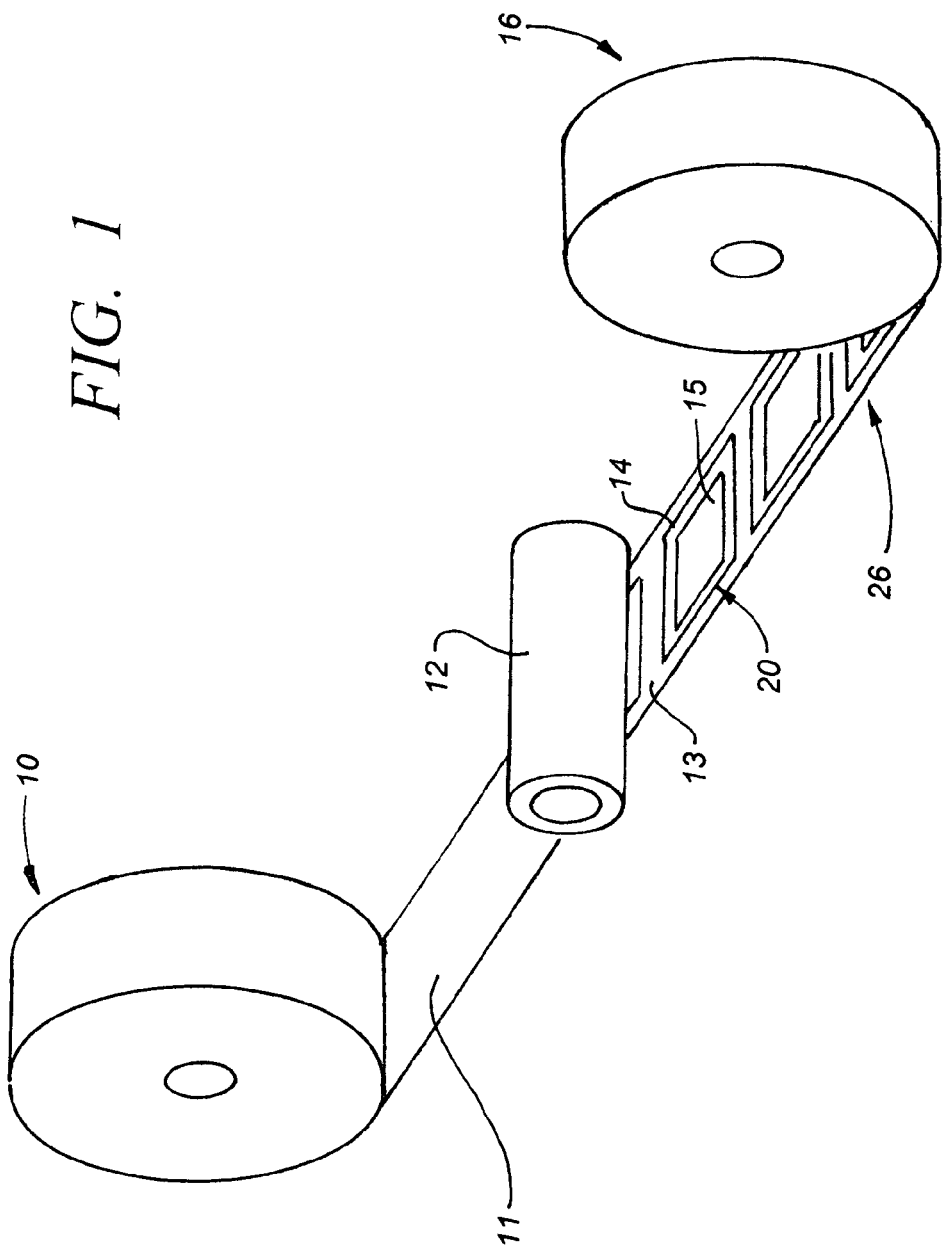
FIG. 1 is a perspective view illustrating apparatus utilized to process a laminate strip to produce laminate labels utilized in the presently preferred embodiment of the invention.
Figure 2:
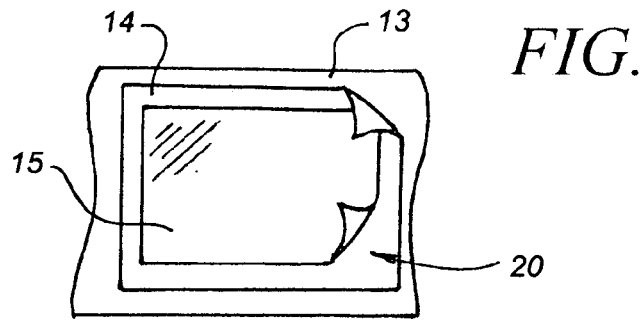
FIG. 2 is a top view illustrating a portion of the laminate label strip of FIG. 1 and the mode of operation thereof.
Figure 3:
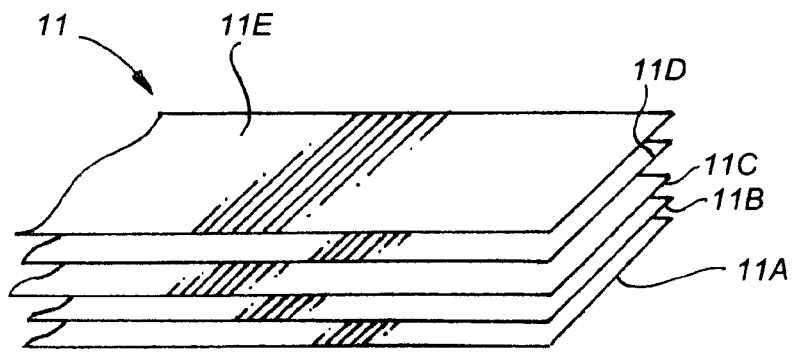
FIG. 3 is an exploded view illustrating the laminate strip illustrated in FIG. 1.

Turning now to the drawings, which depict the presently preferred embodiments of the invention for the purpose of illustration thereof, and not by way of limitation of the invention, and in which like characters refer to corresponding elements throughout the several views, FIG. 1 illustrates a roll 10 of a laminate strip 11. Strip 11 is illustrated in more detail in FIG. 3 and includes a backing strip 11A, a first layer of release adhesive 11B, a first strip 11C of a transparent polymer or some other transparent material, a second layer of release adhesive 11D, and a second strip 11E of a transparent polymer or some other transparent material.

In FIG. 1, die cutting 12 or other appropriate cutting apparatus is utilized to cut through layers 11E, 11D, 11C, and 11B (but not through the backing strip 11A) and to remove portions of layers 11E, 11D, 11C and 11B to produce a label strip consisting of a plurality of separate laminate labels 20 on a backing 13. Backing 13 is comprised of backing strip 11A. Labels 20 can be spaced apart on backing 13 or can be adjacent one another, preferably as long as labels 20 can be removed from backing 13 one at a time. Each label 20 includes an upper transparent layer 15 and a lower transparent layer 14. There is a layer of release adhesive (not visible in FIG. 3) which extends intermediate layer 14 and 15, which has a length and a width generally equivalent to that of layer 15, and which was, prior to strip 11 passing through die cutter 12, a portion of strip 11D. Similarly, there is a layer of release adhesive (not visible in FIG. 3) which extends intermediate layer 14 and backing 13, which has a length and a width generally equivalent to that of layer 14, and which was, prior to strip 11 passing through die cutter 12, a portion of strip 11B.

After strip 11 passes through die cutter 12, the portions of adhesive strips 11B and 11D and of strips 11C and 11E exterior of layers 14 and 15 are peeled off backing strip 11A and are discarded. In the drawings, upper layer 15 is smaller than and lies within the periphery of layer 14, this to facilitate peeling layer 15 off layer 14. If desired, the size of layer 14 can be equivalent to that of layer 15, but such is not presently preferred in the practice of the invention because it can make it difficult to remove layer 15 from layer 14 when the peripheral edge of layer 15 coincides with the peripheral edge of layer 14. Strips 11C and 11E each are comprised of transparent material. If desired, strip 11E can be fabricated from translucent or opaque material so that upper label 15 is opaque. This is not preferred in the practice of the invention.

Layer 11B consists of adhesive that permits layer 14 to be readily peeled off and removed from backing 13 (i.e., from layer 11A) such that the adhesive remains on the bottom of layer 14. Once layer 14, and the adhesive on the bottom of layer 14, is attached to a second surface different from backing 13 (as for example a paper label), more often than not the adhesive will permanently secure to the second surface. Backing 13 has a smooth, relatively "slick" surface which facilitates removal of adhesive from backing 13.

Layer 11D consists of adhesive that permits layer 15 to be readily peeled off and removed from layer 14. Once layer 15 is peeled off layer 14, layer 15 ordinarily is discarded.

Figure 4:
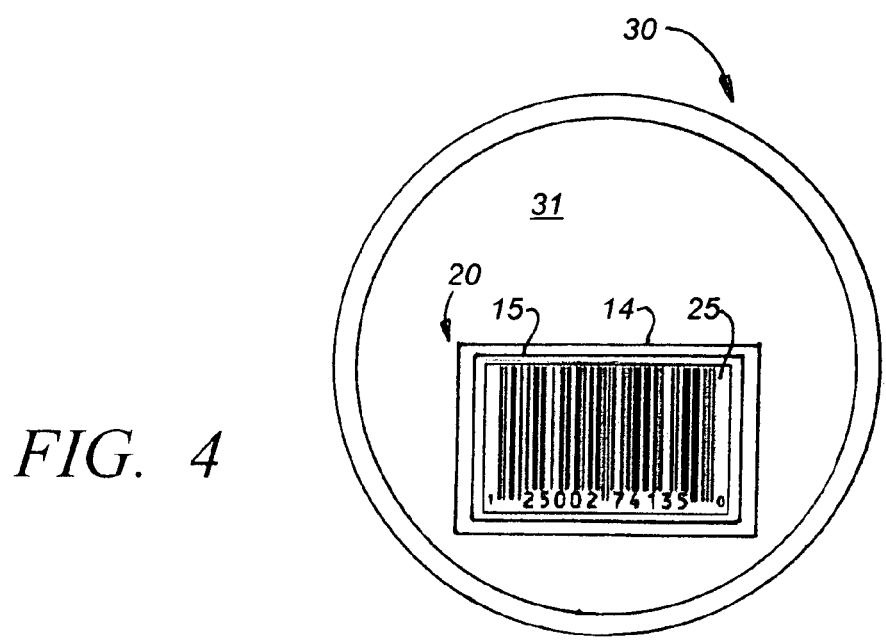
FIG. 4 is a top view of a lid on a paint container further illustrating the mode of operation of the presently preferred embodiment of the invention.

Each label 20 is sized to cover at least partially, preferably completely, indicia that are on a container for a custom coating composition. In FIG. 4, a label 20 covers a formulation identification label 25 that is secured to the top of a five gallon paint container and that includes a bar code identifying the various color components of the paint. The indicia can be imprinted on the container, can be on a label that is applied to the container, ban be on a label that is loosely attached to the container with string or another fastener, can be embedded in the container, or can otherwise be formed on or in, secured to, or associated with the container. In one preferred embodiment, the indicia are on an identification label which has adhesive backing that enables the label to be secured on the container. The indicia define the components necessary to produce a custom coating composition or other composition, and can also, if desired, include instructions for mixing, using, or storing the composition. The indicia are presently preferably visually discernible and can be read by an individual by eye or with an optical reader like a bar code reader. The indicia can also be embedded or otherwise mounted on or in a container and be electronically detectable and decipherable, although this is not presently preferred in the practice of the invention.

The components of a custom coating composition can vary as desired. In one circumstance, the composition may comprise a liquid coating that contains epoxy or other components that help to produce a custom composition that hardens to form a protective layer on an armored car. In another circumstance, the composition may comprise a liquid coating that when applied to glass dries and hardens and strengthens glass and also functions to block ultraviolet light from the sun. In a further circumstance, the composition can comprise a custom paint for a ship, tank, business building, or residence. In still a further circumstance, the composition can comprise a nutritional composition that is ingested by an individual.

Figure 5:
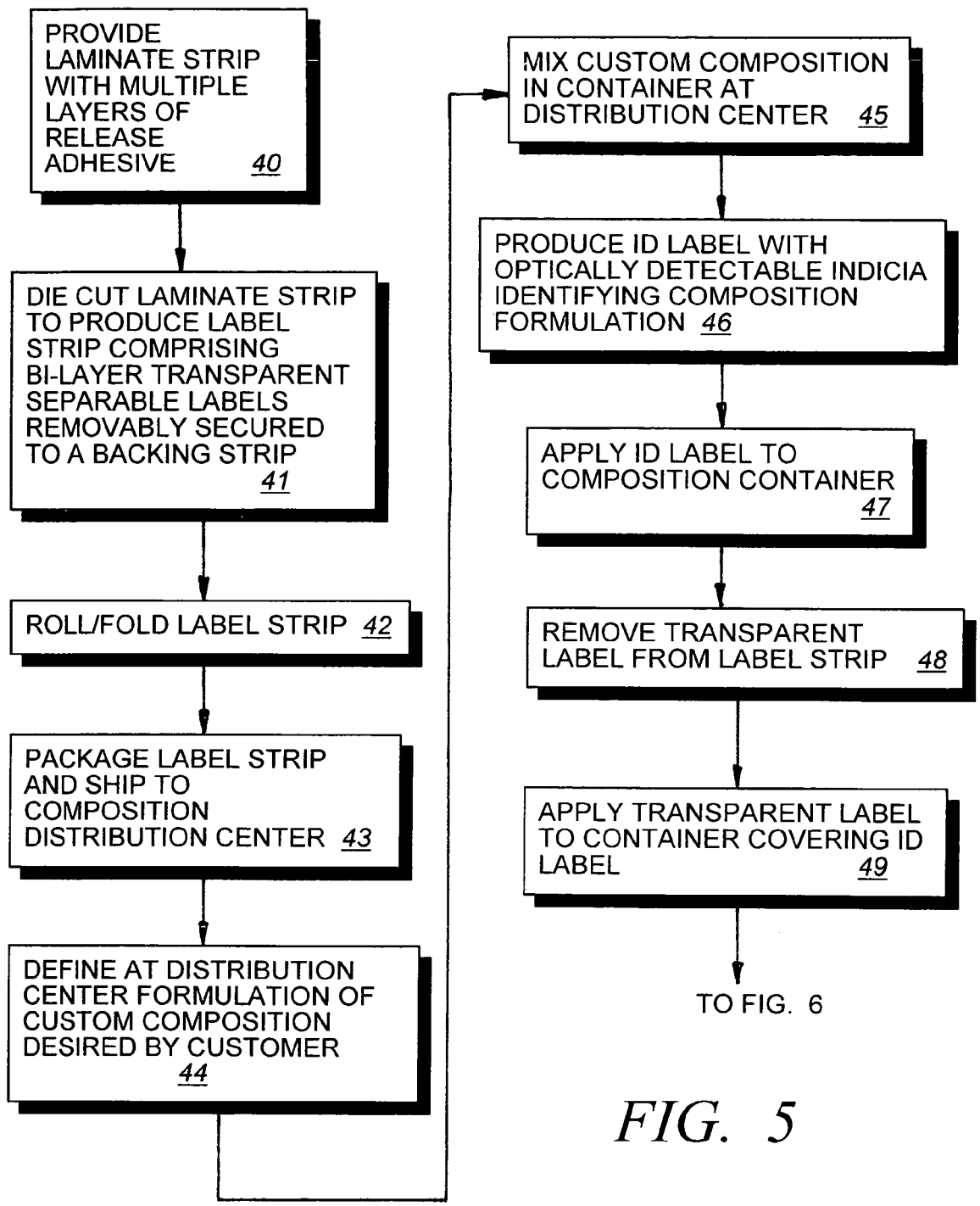
FIG. 5 is a block flow diagram illustrating the presently preferred embodiment of the invention; and, FIG. 6 is a block flow diagram which, taken in conjunction with FIG. 5, further illustrates the presently preferred embodiment of the invention.
Figure 6:
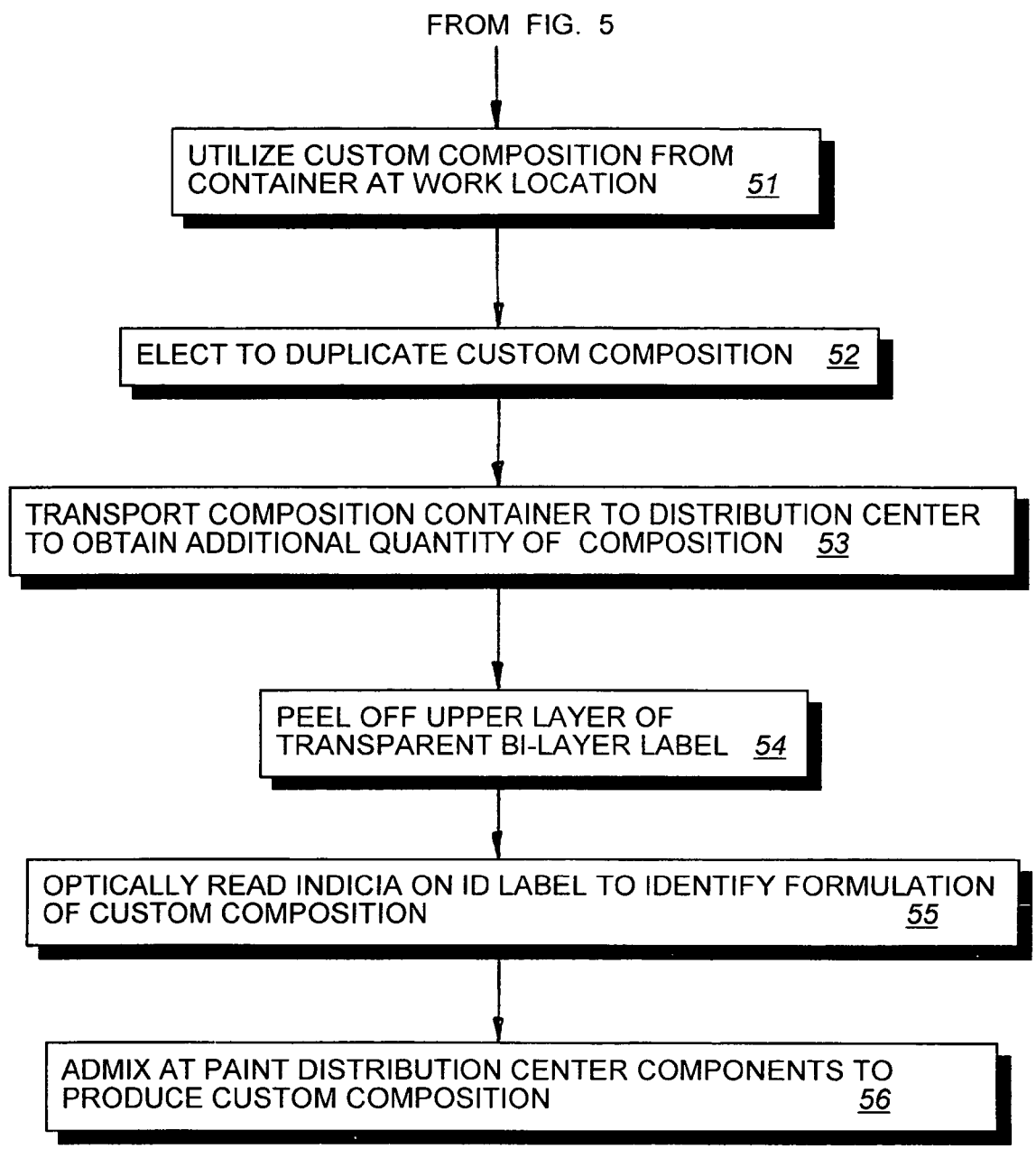

One preferred embodiment of the invention is described in more detail with reference to FIGS. 5 and 6. The first step is to provide 40 a laminate strip 11 which has multiple layers of label material and of release adhesive. The second step is to die cut 41 the laminate strip to produce a label strip 26 comprising bi-layer transparent separable labels 14, 15 that are removably secured to a backing strip 13. The third step 42 is to roll or fold the strip. The fourth step is to package and ship 43 the label strip to a composition distribution center which can produce a desired custom composition coating. At the distribution center, the fifth step is to define 44 the formulation of a custom composition coating desired by a customer. At a minimum, the formulation comprises the components required to make the custom coating composition but can also include directions on how to make, use, and store the composition. The sixth step comprises mixing 45 or otherwise formulating the custom composition in a container at the distribution center, followed by producing 46 an identification (ID) label with optically detectable indicia identifying the composition formulation. In the next step, the ID label is applied 47 to the composition container, after which a transparent label is removed 48 from the label strip 26 and is applied 49 to the container to cover the identification label. The container holding the custom composition coating is then transported to a work site and is utilized 51 at that work site. The user(s) then elect 52 to duplicate the custom composition and transport 53 the composition container to a distribution center to obtain an additional quantity of the composition. At the distribution center, the upper transparent label layer 15 is peeled off 54 to expose the lower transparent layer 14. This can be critical in the event a portion of the composition or some other contaminant has inadvertently covered layer 15 such that the ID label 25 can not be visually discerned. Peeling off layer 15 provides a clear "field of view" through layer 14 to the identification label that is beneath layer 14. The adhesive intermediate layer 14 and the identification label (and between layers 14 ad 15) is also transparent such that an individual can readily read the identification label through layer 14 and the adhesive intermediate layer 14 and the identification label. If a bar code is utilized to indicate the formulation of a custom coating composition, even a small drop or small amount of the composition or some other opaque material can obscure a portion of the bar code and prevent the bar code from being completely read. The indicia on the ID label are then optically read 55 to identify the formulation of the custom coating composition. A new batch of the coating composition is admixed 56 at the distribution center, after which the new batch is transported to a work site and utilized as desired.

After strip 11 passes through die cutter 12, the resulting label strip is packaged, typically by folding the label strip or by collecting the label strip to produce a roll 16. The label strip can, if desired, be further packaged in shrink wrap, in a box, etc. A dispenser can also, if desired, be provided with the label strip. One dispenser functions to separate a label 20 from backing 13 as the label strip is pulled out from the dispenser.

In one embodiment of the invention, only upper label 15 and the release adhesive attached to the bottom of label 15 are utilized and applied to an ID label. This approach is not presently referred because the release adhesive on the bottom of label 15 tends to harden over time and prevent label 15 from being removed from the ID label when it is later desired to read the ID label, particularly if the ID label is made from a material with a rough, absorbent surface.

Being able to remove upper label 15 to read the ID label 25 through transparent label 14 is critical in the practice of the invention. In one scenario that is widely discussed today, a terrorist attack on the United States comprises exploding a single nuclear weapon two to three hundred miles above the United States. The electromagnetic pulse (EMP) produced by such an explosion evidently would, in addition to knocking out most electronic equipment in the country, destroy the electric grid in the United States. It could take years to repair the electric grid. Some catastrophic projections suggest 90% of the population would die of starvation. In such a scenario, computer and other electronic equipment would be rendered inoperative and optical systems would be important in retrieving data for, for example, a nutritional composition that could be admixed and distributed at multiple distribution points around the country. While it is anticipated that many of the compositions admixed in accordance with the invention will be liquid compositions, slurries and mixtures comprised of powders or other particulate can also be utilized.

In another embodiment of the invention, each label 20 is sized to cover at least partially, preferably completely, indicia that are on a container for a selected article or composition (liquid, powder, solid, or slurry). The label 20 could also be sized to cover indicia that are formed directly on a article such as, by way of example and not limitation, a trailer hitch, a television, or other selected article. The indicia can describe the components comprising the composition or article, can describe how to make or use or produce the composition or article, or can provide any other desired information. The shape and dimension of the container or article can vary as desired. The indicia can be imprinted directly on the container or article, can be on a label that is applied to the container or article, can be on a label that is loosely attached to the container or article with string or another fastener, can be embedded in the container or article, or can otherwise be formed on or in, secured to, or associated with the container or article. In one preferred embodiment, the indicia are on an identification label which has adhesive backing that enables the label to be secured on the container or article. The indicia can also be embedded or otherwise mounted on or in a container or article and be electronically detectable and decipherable, although this is not presently preferred in the practice of the invention.

In a further embodiment of the invention, the first step is to provide 40 a laminate strip 11 which has multiple layers of label material and of release adhesive. The second step is to die cut 41 the laminate strip to produce a label strip 26 comprising bi-layer transparent separable labels 14, 15 that are removably secured to a backing strip 13. The third step 42 is to roll or fold the strip. The fourth step is to package and ship 43 the label strip to a distribution center which produces and/or distributes a product. The distribution center can comprise a wholesale outlet, retail outlet, a charitable institution, or any other desired location or organization. At the distribution center, the fifth step is to produce an identification (ID) label with optically detectable indicia that provide desired information concerning the product. In the next step, the ID label is applied to the product, after which a transparent label 20 is removed from the label strip 26 and is applied to the product to cover the identification label. The product is then transported to a selected site(s) and is utilized. At some future time, the user(s) elects to access the identification label. The upper transparent label layer 15 is peeled off to reveal the identification label and the indicia thereon.

Having described the invention and presently preferred embodiments and the Best modes thereof in such terms as to enable one of skill in the art to make and use the invention.

I claim:

1. A method to define, produce, and duplicate a surface coating, comprising the steps of
   (a) providing a laminate strip with multiple transparent label layers and multiple adhesive layers;
   (b) die cutting said laminate strip to produce a label strip comprising a plurality of bi-layer transparent separable labels removably secured to a backing strip, each of said layers including an upper layer and a lower layer;
   (c) packaging said label strip;
   (d) shipping said label strip to a distribution center;
   (e) defining at said distribution center components of a surface coating composition;
   (f) admixing at said distribution center in a container said components to produce said surface coating composition;
   (g) producing an optically detectable identification label the enumerates said components;
   (h) applying said identification label to said container;
   (i) removing one of said transparent separable labels from said label strip;
   (j) applying said removed transparent separable label to said container covering said identification label;
   (k) transporting said container to a work location;
   (l) utilizing at said work location said surface coating composition from said container;
   (m) electing to duplicate said surface coating composition;
   (n) transporting said container to said distribution center;
   (o) peeling said upper layer off said lower layer of said transparent label on said container;
   (p) optically reading through said lower layer of said transparent label said components on said identification label; and,
   (q) admixing said components to produce an additional quantity of said surface coating composition.

* * * * *